(12) United States Patent
Zhang et al.

(10) Patent No.: US 12,153,802 B2
(45) Date of Patent: Nov. 26, 2024

(54) METHOD AND DEVICE FOR LOG STRUCTURED MERGE-TREE BASED KEY-VALUE DATA STORAGE

(71) Applicant: SAMSUNG ELECTRONICS CO., LTD., Suwon-si (KR)

(72) Inventors: Kun Zhang, Suwon-si (KR); Bei Qi, Suwon-si (KR); Dan Cao, Suwon-si (KR); Kun Dou, Suwon-si (KR); Tianyi Zhang, Suwon-si (KR); Zongyuan Zhang, Suwon-si (KR); Ruyi Zhang, Suwon-si (KR); Yutao Li, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 82 days.

(21) Appl. No.: 18/177,985

(22) Filed: Mar. 3, 2023

(65) Prior Publication Data

US 2024/0192860 A1    Jun. 13, 2024

(30) Foreign Application Priority Data

Dec. 12, 2022    (CN) .................. 202211599898.X

(51) Int. Cl.
*G06F 3/06* (2006.01)
*G06F 16/22* (2019.01)

(52) U.S. Cl.
CPC .......... *G06F 3/0619* (2013.01); *G06F 3/0659* (2013.01); *G06F 3/0679* (2013.01); *G06F 16/2246* (2019.01)

(58) Field of Classification Search
None
See application file for complete search history.

(56) References Cited

U.S. PATENT DOCUMENTS

| 8,909,855 | B2 | 12/2014 | Nemazie |
| 9,696,934 | B2 | 7/2017 | Rothberg |
| 10,572,161 | B2 | 2/2020 | Subramanian et al. |
| 11,474,699 | B1 | 10/2022 | Saha et al. |
| 2013/0080687 | A1 | 3/2013 | Nemazie et al. |
| 2020/0334292 | A1 | 10/2020 | Ganeshan et al. |
| 2021/0133208 | A1 | 5/2021 | Tomlinson |

(Continued)

OTHER PUBLICATIONS

You Zhou et al., "Remap-SSD: Safely and Efficiently Exploiting SSD Address Remapping to Eliminate Duplicate Writes", Proceedings of the 19th USENIX Conference on File and Storage Technologies, Feb. 23-25, 2021.

(Continued)

*Primary Examiner* — Kevin Verbrugge
(74) *Attorney, Agent, or Firm* — F. Chau & Associates, LLC

(57) ABSTRACT

A log-structured merge-tree (LSM-Tree) based key-value (KV) data storage method includes writing KV data into a NAND flash memory. The KV data includes a key-value pair including a key and a corresponding value. The KV data is stored in a key-value solid state drive (KVSSD), which includes a storage class memory (SCM) and the NAND flash memory. The method further includes storing metadata of the KV data in the SCM. The metadata of the KV data includes the key and index information of the corresponding value of the KV data, and the index information of the corresponding value of the KV data indicates address information of the KV data in the NAND flash memory.

9 Claims, 15 Drawing Sheets

(56) References Cited

U.S. PATENT DOCUMENTS

2021/0182211 A1 6/2021 Ki
2022/0335028 A1 10/2022 Xue et al.

OTHER PUBLICATIONS

Helen H. W. Chan, et al., "HashKV: Enabling Efficient Updates in KV Storage via Hashing", USENIX Association, 2018 USENIX Annual Technology Conference.

Wenjie Li, et al., "HILSM: An LSM-Based Key-Value Store for Hybrid NVM-SSD Storage Systems", Proceedings of the 17th ACM International Conference on Computing Frontiers, May 11-13, 2020.

Ling Zhan, et al., "RangeKV: An Efficient Key-Value Store Based on Hybrid DRAM-NVM-SSD Storage Structure", IEEE Access, 2020.

Chen Ding et al., "TriangleKV: Reducing Write Stalls and Write Amplification in LSM-Tree Based KV Stroes With Triangle Container in NVM", IEEE Transactions on Parallel and Distributed Systems, vol. 33, No. 12, Dec. 2022.

EESR dated Oct. 2, 2023 in corresponding Appln. No. EP 23 165 052.4.

Ling Zhan et al., "Design and Implementation of SCM and SSD based Hybrid Key-Value Store", Published 2019, Computer Science, Proceedings of the 2019 International Conference on Artificial Intelligence and Computer Science.

| Page0 | Level | startkey | K1 | P1 | K2 | P2 | K3 | P3 |
| Page1 | Level | startkey | K4 | P4 | K5 | P5 | K6 | P6 |
| Page2 | Level | startkey | K7 | P7 | K8 | P8 | K9 | P9 |
| Page3 | Level | startkey | K10 | P10 | K11 | P11 | K12 | P12 |
| Page4 | Level | startkey | K13 | P13 | K14 | P14 | K15 | P15 |
| Page5 | Level | startkey | K16 | P16 | K17 | P17 | K18 | P18 |

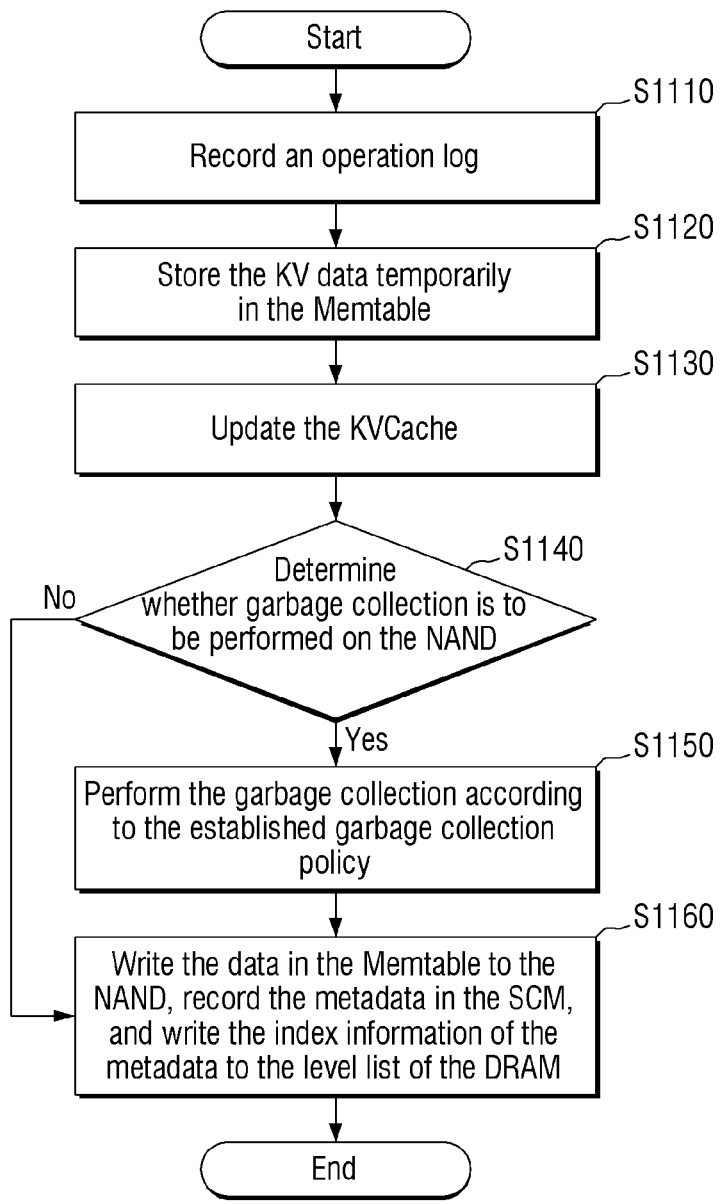

METHOD AND DEVICE FOR LOG STRUCTURED MERGE-TREE BASED KEY-VALUE DATA STORAGE

CROSS-REFERENCE TO RELATED APPLICATIONS

This application claims priority under 35 U.S.C. § 119 to Chinese Patent Application No. 202211599898.X, filed on Dec. 12, 2022, the disclosure of which is incorporated by reference herein in its entirety.

TECHNICAL FIELD

Embodiments of the present disclosure relate to the field of storage technology, and more particularly, to a method and a device for log structured merge-tree based key-value data storage.

DISCUSSION OF RELATED ART

A log-structured merge-tree (LSM-Tree) based Key-Value Solid State Disk (KVSSD) is one of mainstream implementations of KVSSD storage devices today.

In the LSM-Tree based KVSSD, once an abnormal power failure occurs, a full disk scan is performed to reconstruct data indexes and metadata indexes after powering on again. Moreover, under normal circumstances, validity of a data version is determined by address information maintained in indexes. After the abnormal power failure, it may not be possible to distinguish which of the multiple versions of data is a valid version due to loss of index information, and consistency of the data is not guaranteed.

SUMMARY

Embodiments of the disclosure provide a method and device for log-structured merge-tree based key-value data storage, which adds storage class memory (SCM) to a typical DRAM+NAND storage architecture, which may address a data consistency issue when the associated storage device is abnormally powered down.

According to an embodiment of the disclosure, a log-structured merge-tree (LSM-Tree) based key-value (KV) data storage method is provided. The method includes writing KV data into a NAND flash memory. The KV data includes a key-value pair including a key and a corresponding value. The KV data is stored in a key-value solid state drive (KVSSD). The KVSSD includes a storage class memory (SCM) and the NAND flash memory. The method further includes storing metadata of the KV data in the SCM. The metadata of the KV data includes the key and index information of the corresponding value of the KV data, and the index information of the corresponding value of the KV data indicates address information of the KV data in the NAND flash memory.

According to an embodiment of the disclosure, a key-value (KV) solid state drive (KVSSD) includes a storage class memory (SCM) and a NAND flash memory. The KVSSD is configured to store KV data based on a log-structured merge-tree (LSM-Tree), and the KV data includes a key-value pair including a key and a corresponding value. The SCM is configured to store metadata of the KV data. The metadata of the KV data includes the key and index information of the corresponding value of the KV data, and the index information of the corresponding value of the KV data indicates address information of the KV data in the NAND flash memory. The NAND flash memory is configured to store the KV data.

Embodiments of the disclosure may store metadata in the SCM. According to embodiments, the data stored in the SCM will not be lost after an abnormal power failure and restart, which may prevent the loss of index information due to, for example, abnormal power failure. Also, since the index information is stored in both the DRAM and the SCM, a number of accesses to the NAND can be reduced when reading data.

BRIEF DESCRIPTION OF THE DRAWINGS

The above and other features of the present disclosure will become more apparent by describing in detail embodiments thereof with reference to the accompanying drawings.

FIG. 11 illustrates a write data flow according to an embodiment.

DETAILED DESCRIPTION

Figure 1:
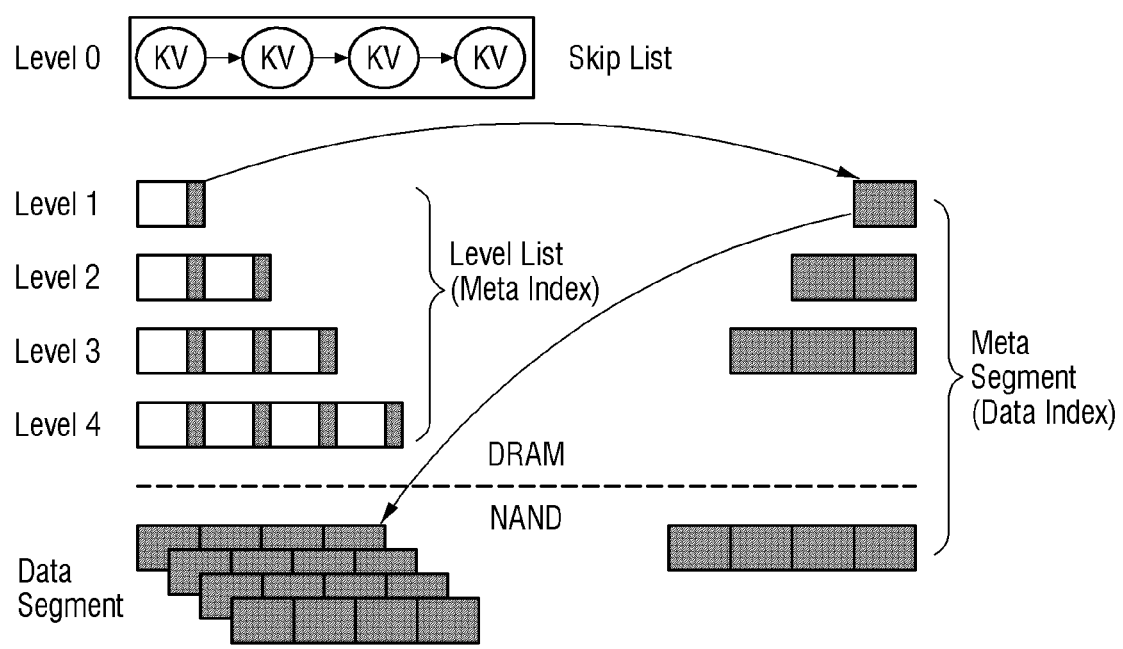
FIG. 1 exemplarily illustrates a log-structured merge-tree (LSM-Tree) based Key-Value Solid State Disk (KVSSD).

Embodiments of the present disclosure will be described more fully hereinafter with reference to the accompanying drawings. Like reference numerals may refer to like elements throughout the accompanying drawings.

It should be noted that the terms "first", "second", etc. in the specification and claims of the disclosure and the accompanying drawings are used to distinguish similar objects rather than to describe a particular order or sequence. It should be understood that data so distinguished may be interchanged, where appropriate, so that embodiments of the disclosure described herein may be implemented in an order other than those illustrated or described herein. Embodiments described in the following examples do not represent all embodiments that are consistent with the disclosure. Rather, they are only examples of devices and methods that are consistent with some aspects of the disclosure.

It should be noted herein that "at least one of the several items" in this disclosure includes "any one of the several items", "any combination of the several items" and "all of the several items" the juxtaposition of these three categories. For example, "including at least one of A and B" includes the following three juxtapositions: (1) including A; (2) including B; (3) including A and B. Another example is "performing at least one of operation one and operation two", which means the following three juxtapositions (1) performing operation one; (2) performing operation two; (3) performing operation one and operation two.

FIG. 1 exemplarily illustrates a log-structured merge-tree (LSM-Tree) based Key-Value Solid State Disk (KVSSD), which reduces tail latency through reducing the number of access to NAND flash by having the high-level KV data indexes resident in an internal dynamic random access memory (DRAM) of the KVSSD.

For example, for a KVSSD with 4 TB capacity, the total size of its level list is about 400 MB, and the level list is resident in DRAM, and the total size of metadata (Meta Segment) is about 165 GB. The metadata is divided by level into 4 levels, of which the first 3 levels are resident in the DRAM and the 4th level is stored in the NAND flash.

In the LSM-Tree based KVSSD, a default KVSSD internal capacitor is utilized so that memory data will not be lost in case of power failure, and the recovery of data after an abnormal power failure is not considered. A power failure protection capacitor of the enterprise-class SSD can only maintain normal operation for a few tens of milliseconds due to the comprehensive consideration of all aspects. Assuming a sequential write bandwidth of 4 GB/s, ideally a few tens of milliseconds would only guarantee about 400 MB data to be written into disk. For the LSM-Tree based KVSSD, in case of the abnormal power failure, the protection capacitor may not guarantee the persistence of all data in the memory. After powering on again, a full disk scan is performed to reconstruct data indexes and metadata indexes. Since garbage collection is not performed in real time, multiple versions of the same data may exist in the NAND flash at the abnormal power failure. Under normal circumstances, validity of a data version is determined by address information maintained in the indexes. However, after the abnormal power failure, it may not be possible to distinguish which of the multiple versions of the data is the valid version due to loss of index information, and the consistency of the data may not be guaranteed.

The LSM-Tree based KVSSD follows an idea of KV separation, and in this way, KV data stored in the NAND may not be guaranteed to be ordered, which may lead to poor range query performance.

Figure 2:
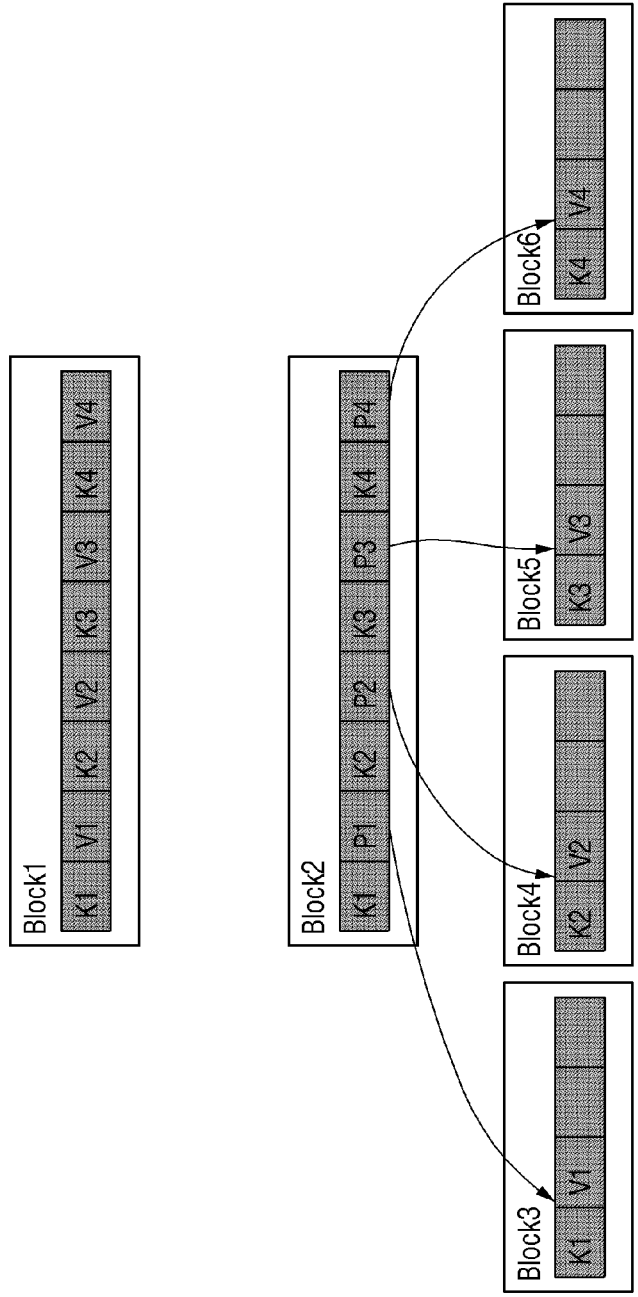
FIG. 2 illustrates a schematic diagram of KV separation leading to read amplification.

FIG. 2 illustrates a schematic diagram of KV separation leading to read amplification.

As shown in FIG. 2, to find a set of KV values located in the range of [K1, K4], only 1 block may be read according to the storage method without KV separation in an upper part of the figure, while 5 blocks are read in the worst case according to the storage method with Key-Value separation in a lower part of the figure.

The LSM-Tree based KVSSD in the example of FIG. 1 stores the first N-1 levels of index data in the DRAM and the last level of the index data in the NAND. Due to a multiplicative relationship between the levels, most of the index data falls to the last level, and the NAND is still accessed twice when reading data.

To address the above issues, embodiments of the disclosure provide a method and a device for log-structured merge-tree based key-value data storage, which adds a storage class memory (SCM) to a typical DRAM+NAND storage architecture, which may address a data consistency issue when the associated storage device is abnormally powered down. Hereinafter, a method and a device for log-structured merge-tree based key-value data storage according to embodiments of the disclosure are described.

Figure 3:
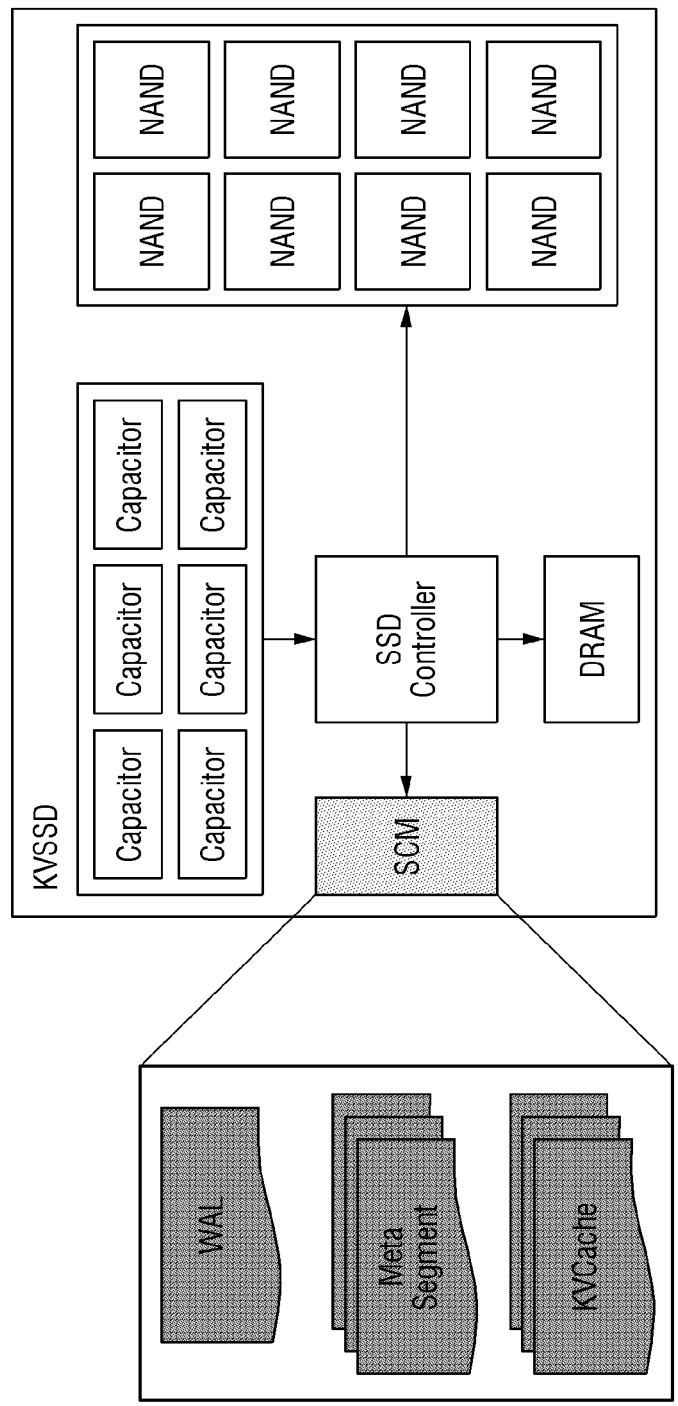
FIG. 3 illustrates a general structure of an SCM-based KVSSD according to an embodiment.

FIG. 3 illustrates a general structure of a SCM-based KVSSD according to an embodiment.

Referring to FIG. 3, based on a typical DRAM+NAND architecture, the storage class memory SCM is introduced into the overall structure of the KVSSD, which is a new type of storage medium having non-volatility, short access latency, and low price. There are many current SCM medium technologies, including phase change memory (PCM). In FIG. 3, logs (WAL, Write Ahead Log), metadata (Meta Segment), and a cache (KVCache, also referred to as KV cache) are included in the SCM. Also, this overall structure includes an SSD controller, capacitors, a dynamic random access memory (DRAM), and flash memories (NANDs). The SCM, the capacitors, the DRAM, and the NANDs are all controlled by the SSD controller.

Figure 4:
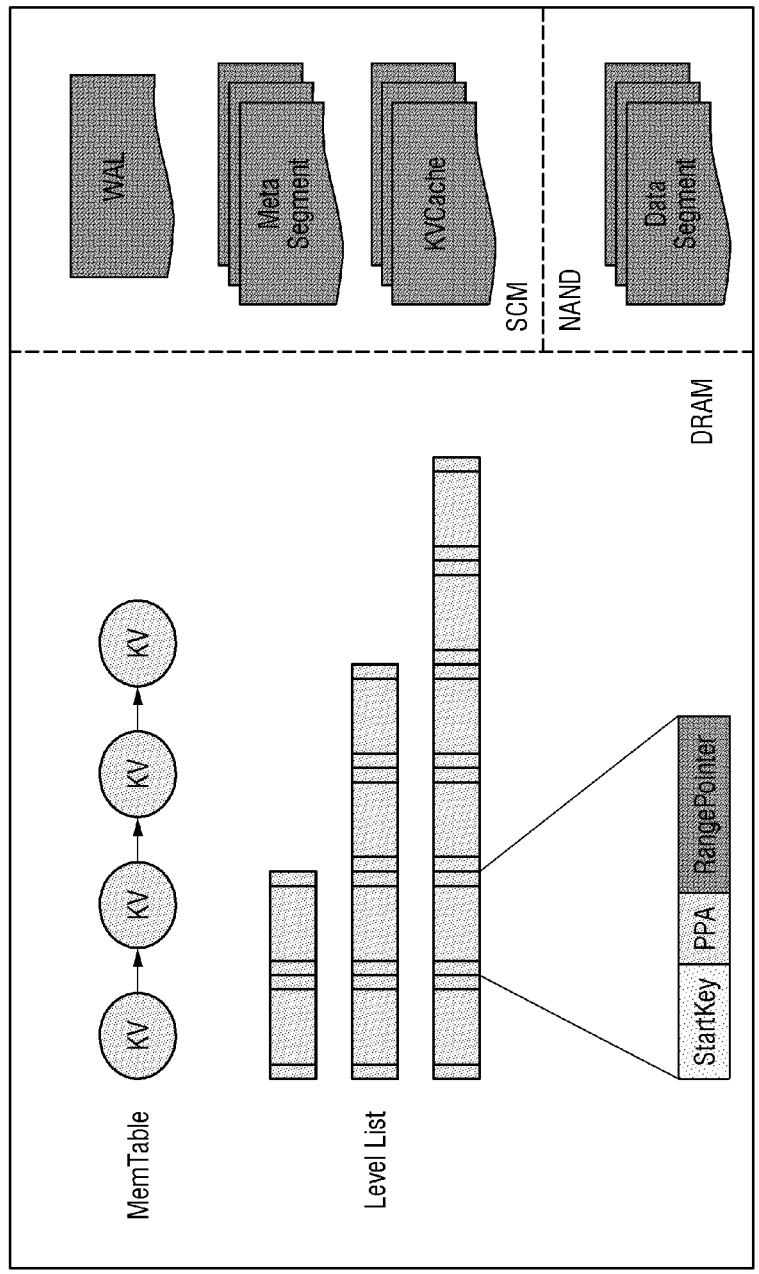
FIG. 4 illustrates a software architecture of an SCM-based KVSSD according to an embodiment.

FIG. 4 illustrates a software architecture of a SCM-based KVSSD according to an embodiment.

The software architecture of the KVSSD with the SCM is shown in FIG. 4, in which logs (WAL), metadata (Meta Segment), and a cache (KVCache) are included in the SCM.

According to an example implementation, a portion of the SCM acts as the cache (KVCache) to store KV data (hereinafter, KV data is also referred to as data) to compensate for the degradation of read performance due to KV separation. The smaller the KV data size (e.g., the data volume size of the KV data) is, the more significant the read performance degradation may be. A threshold value kvSizeThres is set according to an embodiment, and only the data whose KV data size does not exceed this threshold value is cached. In addition, to reduce occupancy of the SCM and overhead of maintaining the cache, threshold values kvReadThres and kvUpdateThres are set in embodiments of the disclosure to cache only the data whose read count is not lower than the kvReadThres and whose update count is not higher than the kvUpdateThres.

According to embodiments, the SCM also stores logs (WAL), as the SCM's high read and write performance over NAND may result in avoiding write performance degradation due to writing logs while ensuring data consistency.

According to embodiments, the SCM also stores metadata (Meta Segment). An area in the SCM where metadata is stored may be referred to as a metadata area (see FIG. 5).

Figures 5, 6:
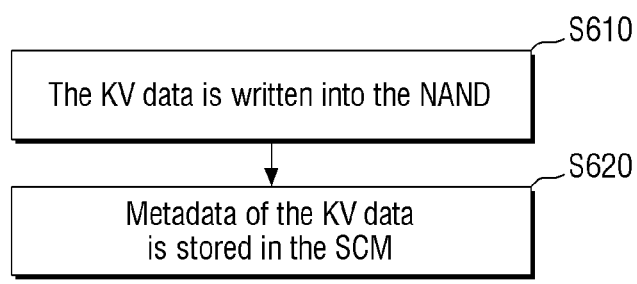
FIG. 5 illustrates a metadata storage structure according to an embodiment.
FIG. 6 illustrates a flowchart of a method for LSM-Tree based KV data storage according to an embodiment.

FIG. 5 illustrates a metadata storage structure according to an embodiment.

Referring to FIG. 5, the metadata area in the SCM is maintained by page (e.g., Page0, Page 1 . . . Page5), and each page maintains a number of Keys (e.g., K1, K2, and K3 in Page0) and index information of their corresponding values in an ordered manner (e.g., the index information of value indicates address information of the KV data in the NAND, e.g., P1, P2, and P3 in Page0). Each key and index information of its corresponding value may be called as an index of KV data (or data index) or metadata, for example, K1-P1 or K2-P2. Each key and its corresponding value may be referred to as a key-value pair. Also, each page maintains additional level information (Level) and start key information (Startkey). When an abnormal power failure occurs and the level list information in the DRAM is lost, all pages in the metadata area may be scanned, and the level list may be reconstructed in the DRAM based on the level information and the start key information on each page.

Referring back to FIG. 4, the DRAM includes a memory table (MemTable) and the level list (Level List), and the NAND stores data (Data Segment). The latest written data is temporarily stored in the MemTable, and then the data is subsequently written into the NAND flash. The level list uses a hierarchical form to store index information of the metadata (e.g., node information), and information of commonly used data may be stored in the shorter upper levels. The node information of the level list includes a start key (Startkey), a page address (PPA), and a range pointer (RangePointer), and the node information may be arranged in ascending or descending order of the start key in the level list. The start key indicates the start key information of each page of metadata maintained by the page, the page address indicates the address of the metadata page corresponding to the start key, and the range pointer indicates the range of the key of the page. If the key is known, the metadata page in the SCM may successfully be located through the node information (e.g., the index information of the metadata) in the level list, and then the Key and index information of its corresponding value (e.g., metadata) may be found through the search of page information. The index information of the value indicates the address information of the KV data in the NAND, and the KV data (value) may be obtained in the NAND according to the index information of the value.

It should be understood that the hierarchy of the level list and configurations are only examples, and embodiments of the disclosure are not limited thereto.

FIG. 6 illustrates a flowchart of a method for LSM-Tree based KV data storage according to an embodiment.

According to an embodiment, KV data is stored in a KVSSD, which includes an SCM and a NAND flash device.

First, in operation S610, the KV data is written into the NAND.

Next, in operation S620, metadata of the KV data is stored in the SCM. The metadata of the KV data includes a value of the key and the index information of the value of the KV data, and the index information of the value indicates address information of the KV data in the NAND. After the KV data is written into the NAND, the address information of the KV data stored in the NAND may be obtained. Thus, the value of the key of the KV data and the index information of the value indicating the address information of the KV data in the NAND may be stored in the SCM as metadata. For example, a corresponding key (e.g. K1) may be obtained from the KV data according to a pre-set algorithm, and then the address information of the KV data in NAND, which is the index information of the Value (e.g. P1), may be obtained. The key and the index information of the value are written as metadata (e.g., K1-P1) in the order of the key to a metadata area maintained by the page in the SCM.

According to an embodiment, the KVSSD may further include a dynamic random access memory (DRAM). Index information of the metadata is created in a level list stored in the DRAM based on the metadata, and the index information of the metadata indicates address information of the metadata in the SCM. Here, the key of the KV data and the index information of its corresponding value (e.g., metadata) are stored by the page in the SCM. The level list in DRAM stores the index information of metadata (e.g., node information), and the node information of level list includes a start key (Startkey), a page address (PPA) and a range pointer (RangePointer). The metadata area in SCM is maintained by the page, while each page maintains additional level information and start key information. As a result, the relevant pages of the metadata in the metadata area corresponding to the stored KV data may be scanned to obtain the start key information stored in each page, the range of the key of the page, and the address information of the page to construct the node information (e.g., the index information of the metadata) of the node of the level list. The level information stored in the page may be obtained, and then the node is stored hierarchically in an orderly manner in the level list in the DRAM according to the level information. In this way, the storage operation of the KV data is completed.

After the completion of the KV data storage operation, when reading the KV data, in the case of a known key, the node information is first traversed from the level list, and if the key falls within the range of [Startkey1, Startkey1+RangePointer1], then the page address PPA1 of the node information is obtained to find the page where the corresponding metadata is located. The page where the metadata is located stores several keys and index information of their corresponding values. According to the known key, the target key and index information of its corresponding value may be found in the page, that is, the address information of the KV data may be found. Based on the address information, the KV data may be read from the NAND.

According to an embodiment as described above, the metadata is stored in the SCM. As a result, the data in the SCM will not be lost after an abnormal power failure and restart, avoiding the loss of index information due to the abnormal power failure. Also, since the index information is stored in both the DRAM and the SCM, the number of access to the NAND can be reduced when reading data.

According to an embodiment, the level list including the index information of the metadata is reconstructed in the DRAM based on the metadata stored in the SCM, after an abnormal power failure and restart of a storage device. Here, the metadata is stored in the metadata area of the SCM in the form of a page, and each page includes corresponding level information and start key information. After the abnormal power failure and restart of the storage device, if a write data operation includes the KV data that has not been written into the NAND (hereinafter, referred to as unflushed KV data), the unflushed KV data is written to the NAND. The metadata of the unflushed KV data (the key and index information of its corresponding value) is written to the metadata area, and the index information of the metadata corresponding to the metadata of the unflushed KV data is updated to the level list.

Figure 7:
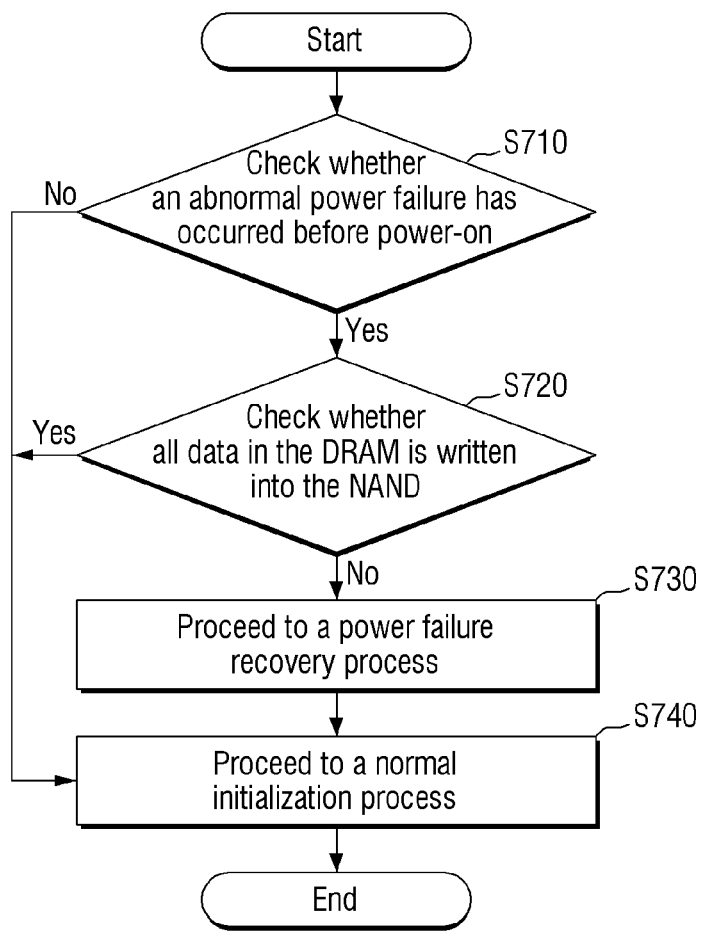
FIG. 7 illustrates a power-on and start process of a storage device KVSSD according to an embodiment.
Figure 8:
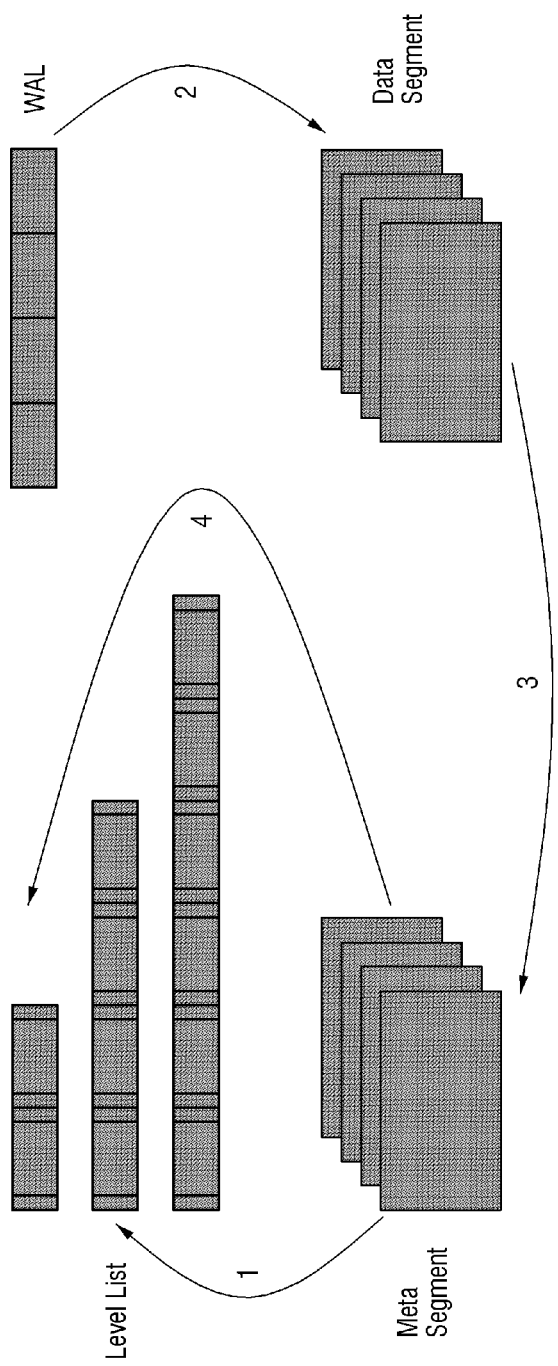
FIG. 8 illustrates a power failure recovery process of a storage device KVSSD according to an embodiment.

Referring to FIGS. 7 and 8, a power-on and start-up process and a power failure recovery process of the storage device KVSSD after the abnormal power failure and restart according to embodiments is described.

FIG. 7 illustrates a power-on and start-up process of a storage device KVSSD according to an embodiment.

Referring to FIG. 7, in operation S710, it is determined whether an abnormal power failure has occurred before power-on. If an abnormal power failure has not occurred, the process advances to operation S740. If an abnormal power failure has occurred, the process advances to operation S720.

In operation S720, whether all data in the DRAM is written into the NAND is Checked. For example, the write completion flag bit of the corresponding write operation in the NAND may be checked to determine whether all data in the DRAM is written into the NAND at the time of power failure. The latest written data will be temporarily stored in the MemTable of the DRAM, and the data will be written to the NAND later, and the write completion flag bit will be set in the NAND after the NAND write operation is completed. If the write operation has a corresponding write completion flag bit, then the write operation is completed. If the write operation does not have the corresponding write completion flag bit, then it may be determined that not all data in the DRAM is written into the NAND. If yes, the process advances to operation S740; if not, the process advances to operation S730.

It should be understood that the method of checking whether the data has all been written into NAND is only an example, and embodiments of the disclosure are not limited thereto.

In operation S730, the process proceeds to a power failure recovery process. The power failure recovery process is described in detail below with reference to FIG. 8.

In operation S740, the process proceeds to a normal initialization process. At this point, no abnormal power failure has occurred or the abnormal power failure has no effect on the data written from the DRAM to the NAND, and an initialization process of the KVSSD can be carried out according to a normal initialization process.

FIG. 8 illustrates a power failure recovery process of a storage device KVSSD according to an embodiment.

In FIG. 8, 4 operations are illustrated and are denoted by the numbers 1, 2, 3 and 4.

In operation 1, the metadata area located in the SCM is scanned and the level information and the start key information stored in each page is read. The level information and the start key information stored in each page together with the address information of the page and the range of the key of the page are used to construct the nodes of the level list, and are stored in a hierarchically ordered manner into the level list in the DRAM.

In operation 2, the logs (WAL) are checked to determine if there is any data that has not been written into NAND (hereinafter, referred to as unflushed data), and if so, the unflushed data is written to the data (Data Segment) area in the NAND. For example, it may be checked whether the size of the write data recorded in the write operation log and the actual size of the data written into the NAND are the same to determine whether there is any unflushed data. In a write data operation, the write operation log is typically recorded first, and then the data is written after the log is completed. The write operation log records various types of information about the write data (such as, e.g., the size of the data). If the size of the write data recorded in the log is the same as the actual size of the data written to the NAND, there is no unflushed data, which may occur because the write completion flag in the NAND has not been set. If the size of the write data recorded in the log and the actual size of the data written into the NAND are not the same, then there is unflushed data, and the unflushed data is then written to the data area in the NAND to complete the write operation.

It should be understood that the method of checking the logs to determine whether there is unflushed data is only an example, and embodiments of the disclosure are not limited thereto.

In operation 3, the key and index information of the value of the data written into NAND in operation 2 are recorded to the metadata in the SCM. Here, the data written into the NAND is also the unflushed data in operation 2. For example, the corresponding key (e.g. K1) may be obtained from the data according to the pre-set algorithm, and then the address information of the data may be obtained, which is the index information of the Value (e.g. P1). The key and the index information of the value are written as the metadata in the order of the key to the metadata area maintained by the page in the SCM.

In operation 4, the update of the metadata is synchronized to the level list of the DRAM. The index information of the metadata corresponding to the index of the unflushed KV data is updated to the level list. For example, if no new page is added to the metadata area in the SCM, but only the metadata is inserted on the existing page, which changes the range of the range pointer (RangePointer) in the node information of the level list, then the range of the range pointer in the corresponding node information in the level list may be updated. For another example, if a new page is added to the metadata area in the SCM, then the level information and the start key information of the new page may be added, and the level information and the start key information of the new page together with the address information of the page and the range of the key of the page may be used to construct a node of the level list, and which are added into the level list according to the predefined order.

It should be understood that the method of updating the level list is only an example, and embodiments of the disclosure are not limited thereto.

According to an embodiment as described above, storing metadata in the SCM may prevent loss of index information due to, for example, the abnormal power failure, and may enable recovery of the level list in the DRAM based on metadata at power-on, which may increase the efficiency of power failure recovery.

According to an embodiment, a portion of the SCM is configured as a cache, and the KV data satisfying a cache condition is stored in the cache. In an embodiment, the cache condition may be that the KV data size is less than a first threshold value. In an embodiment, the cache condition may further be that at least one of a read count of the KV data is greater than or about equal to a second threshold value and that an update count of the KV data is less than or about equal to a third threshold.

Since the smaller the KV data size (the data size of the KV data) is, the more significant the read performance degradation is, according to an embodiment, a threshold kvSizeThres is set and only the data whose KV data size does not exceed this threshold is cached in the cache (also referred to as KV cache or KVCache) of the SCM. Further, considering two factors of whether this data is frequently read and whether it is frequently updated, the thresholds kvReadThres and kvUpdateThres are set such that only the KV data whose read count is not lower than kvReadThres and/or whose update count is not higher than kvUpdateThres is cached in the KVCache of the SCM.

Figure 9:
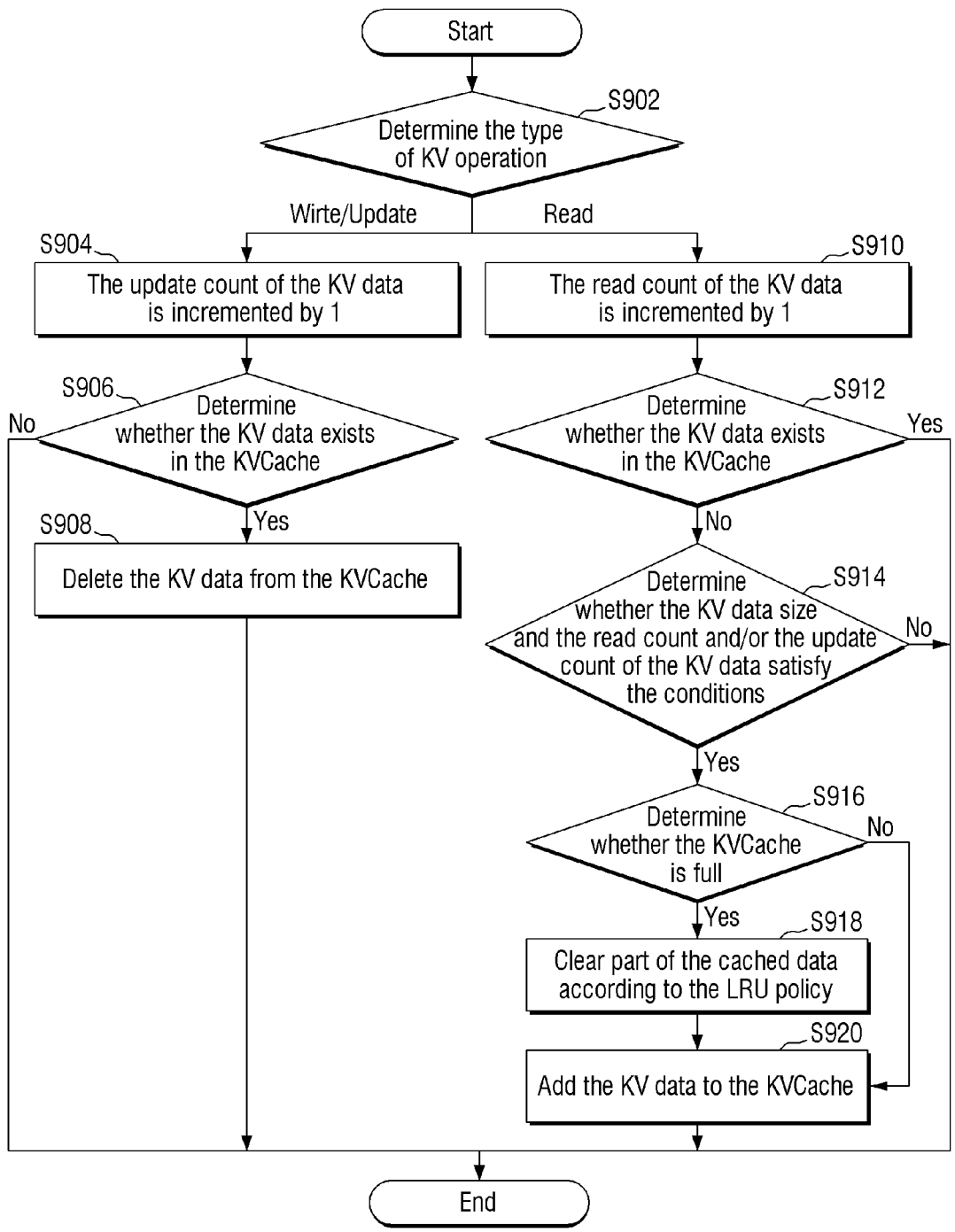
FIG. 9 illustrates an update process of a KVCache according to an embodiment.

FIG. 9 illustrates an update process of a KVCache according to an embodiment.

In operation S902, the type of KV operation is determined. If the KV operation is a write operation or an update operation of KV data, the process advances to operation S904. In operation S904, if it is an update operation of KV data, the update count of the KV data is incremented by 1 and the process advances to operation S906. In operation S906, it is determined whether the KV data exists in the KVCache. If it is determined that the KV data does not exist in the KVCache, the process ends. If it is determined that the KV data exists in the KVCache, operation S908 is performed. In operation S908, the KV data is deleted from the KVCache.

Referring again to operation S902, if the KV operation is a read operation of the KV data, the process advances to operation S910. In operation S910, the read count of the KV data is incremented by 1, and the process advances to operation S912.

In operation S912, it is determined whether the KV data exists in the KVCache. If the KV data exists in the KVCache, the process ends. If the KV data does not exist in the KVCache, the process advances to operation S914.

In operation S914, it is determined whether the KV data satisfies the conditions that the size does not exceed the kvSizeThres and the read count is not lower than the kvReadThres and/or the update count is not higher than the kvUpdateThres. If the conditions are not satisfied, the process ends. If the conditions are satisfied, the process advances to operation S916.

In operation S916, it is determined whether the KVCache is full. If the KVCache is full, the process advances to operation S918. If the KVCache is not full, the process advances to operation S920. In operation S918, part of the cached data is cleared according to a least recently used (LRU) policy and the process advances to operation S920. In operation S920, the KV data is added to the KVCache.

According to an embodiment, when reading data, the KV data is read from the cache. If the KV data is found, the KV data is read successfully. If the KV data is not found, the KV metadata is acquired from the SCM and then the KV data is read from the NAND based on the metadata.

Figure 10:
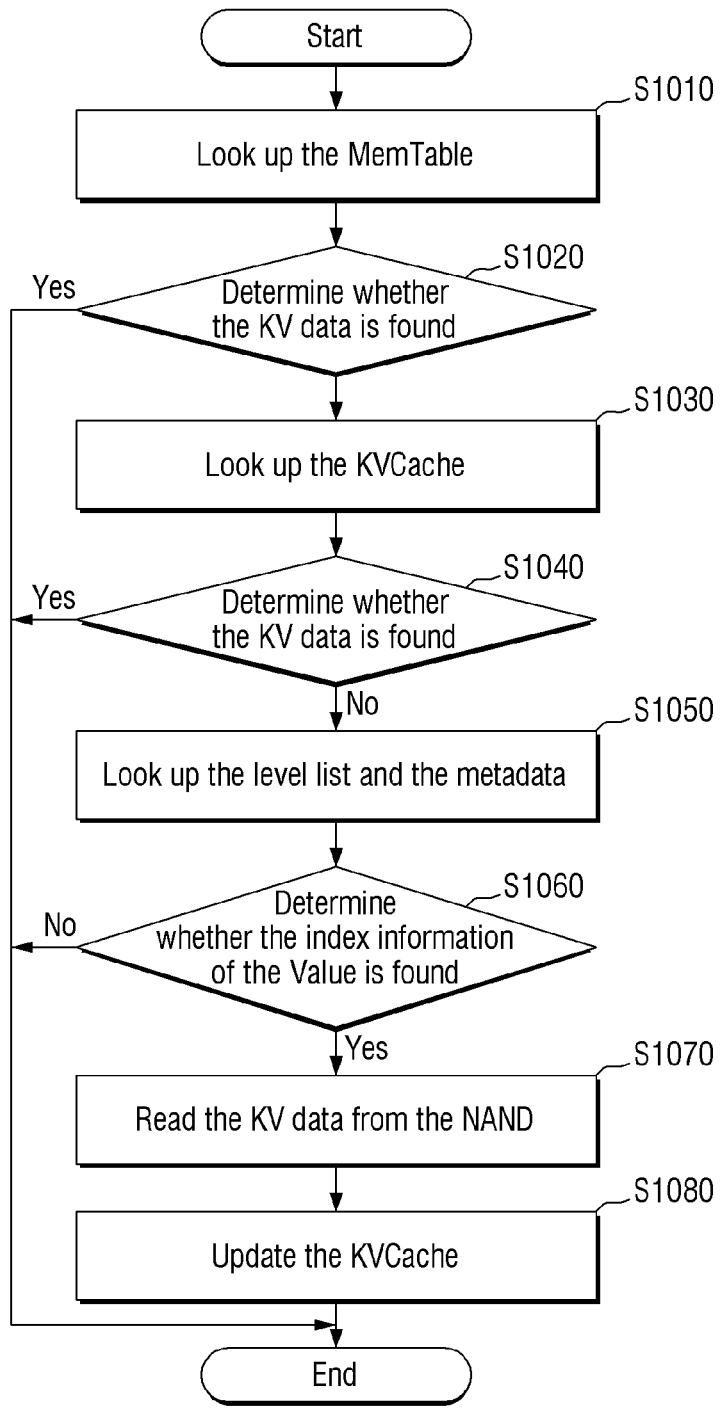
FIG. 10 illustrates a read data flow according to an embodiment.

FIG. 10 illustrates a read data flow according to an embodiment.

According to an embodiment of the disclosure, the latest written KV data is temporarily stored in the MemTable, and the data is subsequently written to the NAND flash. The KVCache in the SCM also stores the KV data that satisfies the cache conditions. The read data flow of the KV data can be described as follows. In operation 1, the MemTable is searched for the KV data, and if found, the process returns immediately. In operation 2, the KVCache is searched for the KV data, and if found, the process returns immediately. In operation 3, the KV data is searched for by index, and if not found, the process returns immediately. In operation 4, the KV data is read in the NAND and the KVCache is updated. The read data flow of the KV data is described in further detail with reference to FIG. 10 below.

In operation S1010, the MemTable is looked up, and the process advances to operation S1020, where it is determined whether the KV data is found. If the KV data is found, the process ends. If the KV data is not found, the process advances to operation S1030.

In operation S1030, the KVCache is looked up, and the process advances to operation S1040, where it is determined whether the KV data is found. If the KV data is found, the process ends. If the KV data is not found, the process advances to operation S1050.

In operation S1050, the level list and the metadata is looked up, and the process advances to operation S1060, where it is determined whether the index information of the value is found. If the index information is not found, the process ends. If the index information is found, the process advances to operation S1070. In operation S1070, the KV data is read from the NAND by using the obtained index information of the value and the process advances to operation S1080. In operation S1080, the KVCache is updated.

According to an embodiment as described above, the SCM acts as a read cache and stores hot data copies. As a result, the read amplification issue due to KV separation may be minimized or reduced, and the read performance may be increased. Further, the data in the cache will not be lost after an abnormal power failure and restart, preventing or reducing fluctuations in read performance.

According to an embodiment, the SCM also stores logs. Further, the write operation log is recorded in the SCM, the written KV data is stored in the NAND, the index of the written KV data (e.g., the key value and the index information of the value of the KV data) is written to the metadata area where the metadata is located, and the index information of the metadata corresponding to the index of the written KV data is updated to the level list.

FIG. 11 illustrates a write data flow according to an embodiment.

In operation S1110, an operation log is recorded. The write operation log is typically recorded before writing the data, the data is written after the log is written into the SCM, and the write operation log records various information (such as, e.g., the size of the data) of the write data.

In operation S1120, the KV data is temporarily stored in the Memtable. The latest written data is temporarily stored in the MemTable, and the data is subsequently written to the NAND.

In operation S1130, the KVCache is updated. For example, if some KV data is found to be frequently written, that is, if its value is frequently refreshed, storage of the KV data in the KVCache may be meaningless and the KV data may be deleted.

In operation S1140, it is determined whether garbage collection is to be performed on the NAND. If garbage collection is to be performed, the process advances to operation S1150. If garbage collection is not to be performed, the process advances to operation S1160. In operation S1150, the garbage collection is performed according to an established garbage collection policy, and the process advances to operation S1160.

In operation S1160, the data in the Memtable is written to the NAND, the metadata is recorded in the SCM, and then the index information of the metadata is written to the level list of the DRAM. For example, the corresponding Key (e.g., K2) may be obtained from the written data according to a pre-set algorithm, and then the address information of the written data, which is the index information of the value (e.g., P2), may be obtained. The key and the index information of the value are written as metadata in the order of the key to the metadata area maintained by the page in the SCM. Then, for example, the information of the nodes in the level list may be modified or the information of the node in the level list may be added based on the change of the metadata in the SCM (due to the addition of the metadata corresponding to the written data).

According to an embodiment as described above, storing logs in the SCM utilizes the SCM's increased read and write performance compared to NAND, and may prevent write performance degradation due to writing logs while also ensuring data consistency.

Figure 12A:
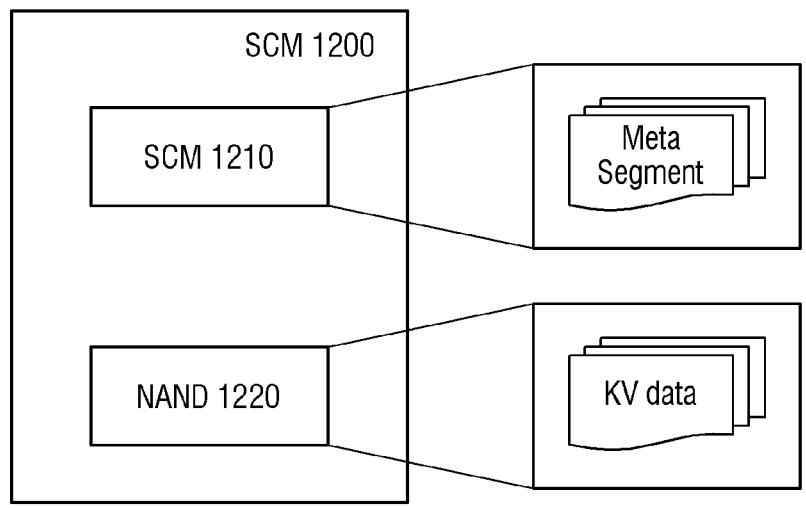
FIG. 12A illustrates an example of a KVSSD according to an embodiment.

FIG. 12A illustrates an example of a KVSSD according to an embodiment.

The KVSSD may store KV data based on the LSM-Tree, as shown in FIG. 12A. The KVSSD 1200 may include an SCM 1210 and a NAND flash device 1220. The SCM 1210 may store metadata of the KV data, which includes the key value and index information of the value of the KV data. The NAND flash device 1220 may store the KV data. The index information of the value indicates address information of the KV data in the NAND.

Figure 12B:
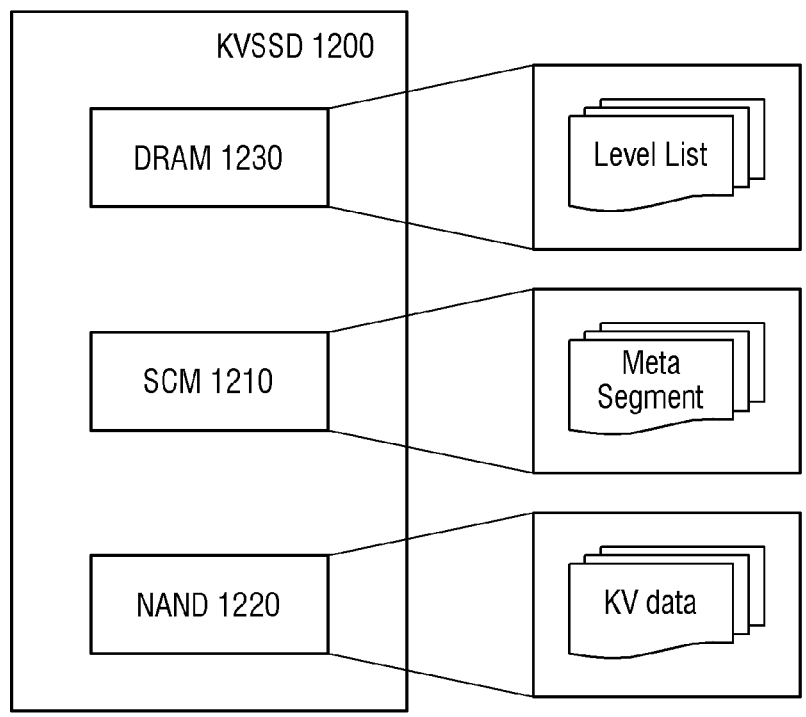
FIG. 12B illustrates an example of a KVSSD according to an embodiment.

FIG. 12B illustrates an example of a KVSSD according to an embodiment.

As shown in FIG. 12B, the KVSSD 1200, in addition to an SCM 1210 and a NAND flash memory device 1220, may also include a DRAM 1230 according to an embodiment. The DRAM 1230 may store a level list including index information of the metadata. The index information of the metadata indicates address information of the metadata in the SCM.

According to an embodiment, the level list including the index information of the metadata is reconstructed in the DRAM based on the metadata stored in the SCM, after an abnormal power failure and restart of a storage device.

Figure 12C:
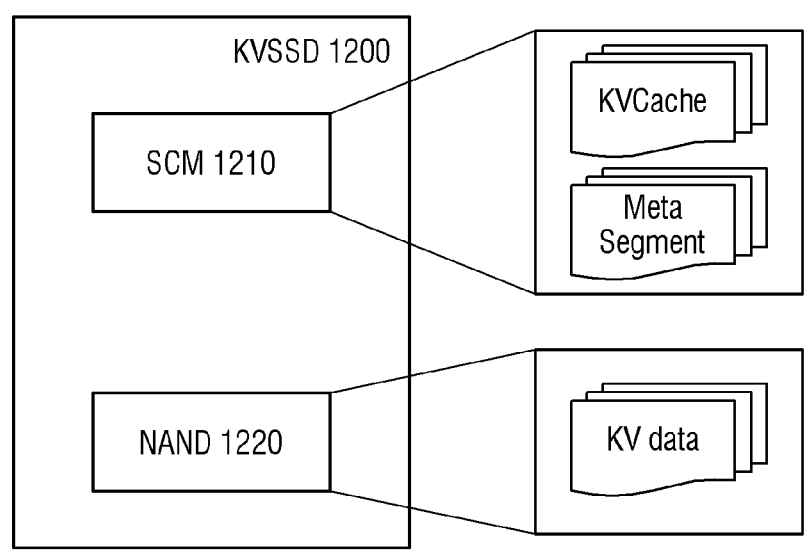
FIG. 12C illustrates an example of a KVSSD according to an embodiment.

FIG. 12C illustrates an example of a KVSSD according to an embodiment.

As shown in FIG. 12C, the KVSSD 1200 includes an SCM 1210 and a NAND flash device 1220, and a portion of a storage area of the SCM 1210 is also configured as a cache while the SCM 1210 stores metadata for KV data according to an embodiment. KV data satisfying cache conditions is stored into the cache.

Referring to a KVSSD according to an embodiment as described above, the metadata is stored in the SCM, and as a result, data in the SCM is not lost after an abnormal power failure and restart, thus preventing loss of index information due to the abnormal power failure. Also, since the index information is stored in both the DRAM and the SCM, the number of access to NAND can be reduced when reading data. Further, the SCM acts as a read cache and stores hot data copies. As a result, the read amplification issue due to KV separation can be minimized or reduced, and the read performance can be increased. Further, the data in the cache will not be lost after an abnormal power failure and restart, thus preventing or reducing fluctuations in read performance.

Figure 13:
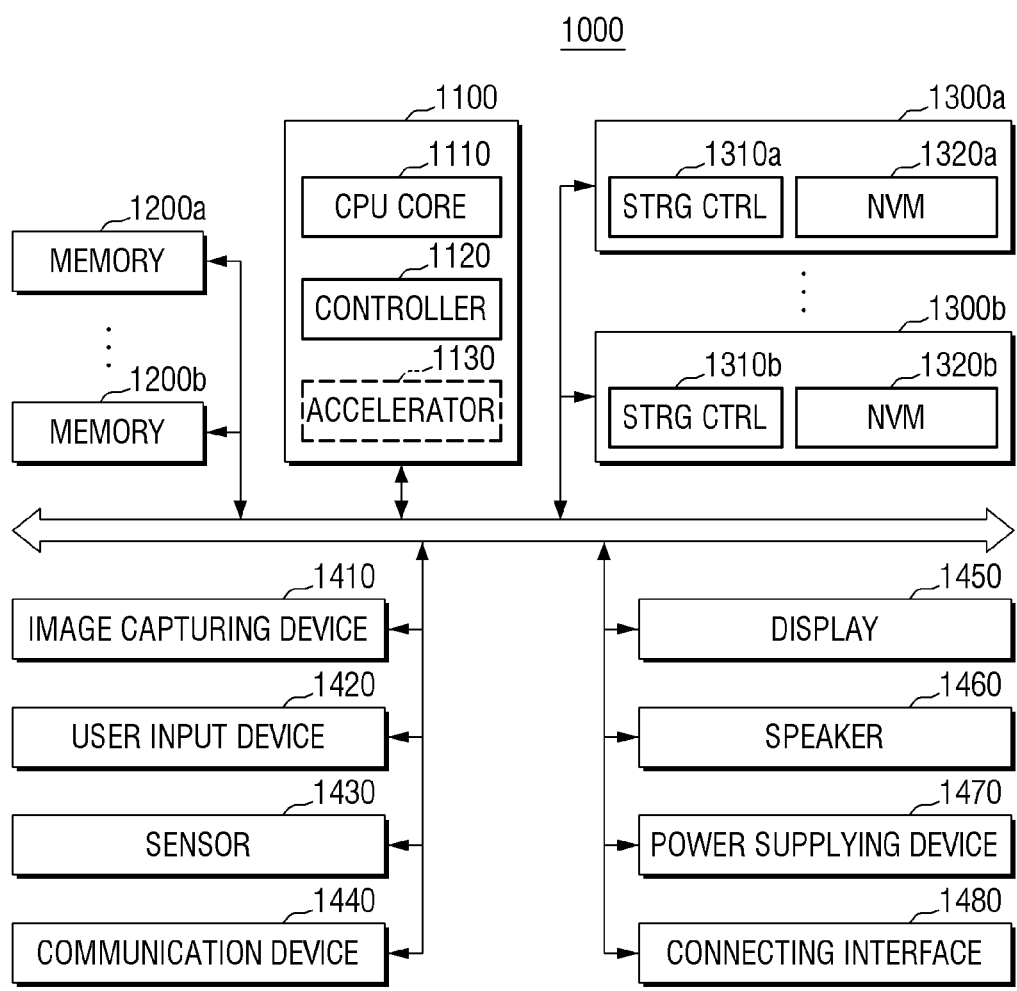
FIG. 13 is a diagram of a system to which a storage device is applied according to an embodiment.

FIG. 13 is a diagram of a system 1000 to which a storage device is applied according to an embodiment.

The system 1000 of FIG. 13 may be, for example, a mobile system, such as a portable communication terminal (e.g., a mobile phone), a smartphone, a tablet personal computer (PC), a wearable device, a healthcare device, or an Internet of Things (IOT) device. However, the system 1000 of FIG. 13 is not limited thereto and may be, for example, a PC, a laptop computer, a server, a media player, or an automotive device (e.g., a navigation device).

Referring to FIG. 13, the system 1000 may include a main processor 1100, memories (e.g., 1200a and 1200b), and storage devices (e.g., 1300a and 1300b). In addition, the system 1000 may include at least one of an image capturing device 1410, a user input device 1420, a sensor 1430, a communication device 1440, a display 1450, a speaker 1460, a power supplying device 1470, and a connecting interface 1480.

The main processor 1100 may control all operations of the system 1000 including, for example, operations of other components included in the system 1000. The main processor 1100 may be implemented as, for example, a general-purpose processor, a dedicated processor, or an application processor.

The main processor 1100 may include at least one CPU core 1110 and a controller 1120 configured to control the memories 1200a and 1200b and/or the storage devices 1300a and 1300b. In some embodiments, the main processor 1100 may further include an accelerator 1130, which is a dedicated circuit for a high-speed data operation, such as, for example, an artificial intelligence (AI) data operation. The accelerator 1130 may include, for example, a graphics processing unit (GPU), a neural processing unit (NPU) and/or a data processing unit (DPU), and may be implemented as a chip that is physically separate from the other components of the main processor 1100.

The memories 1200a and 1200b may be used as main memory devices of the system 1000. Although each of the memories 1200a and 1200b may include a volatile memory, such as, for example, static random access memory (SRAM) and/or dynamic RAM (DRAM), each of the memories 1200a and 1200b may include non-volatile memory according to embodiments, such as, for example, a flash memory, phase-change RAM (PRAM) and/or resistive RAM (RRAM). The memories 1200a and 1200b may be implemented in the same package as the main processor 1100.

The storage devices 1300a and 1300b may serve as non-volatile storage devices configured to store data regardless of whether power is supplied thereto, and may have a larger storage capacity than the memories 1200a and 1200b. The storage devices 1300a and 1300b may respectively include storage controllers (STRG CTRL) 1310a and 1310b and non-volatile memories (NVM) 1320a and 1320b configured to store data under the control of the storage controllers 1310a and 1310b. Although the NVMs 1320a and 1320b may include flash memories having a two-dimensional (2D) structure or a three-dimensional (3D) V-NAND structure, the NVMs 1320a and 1320b may include other types of NVMs, such as, for example, PRAM and/or RRAM.

The storage devices 1300a and 1300b may be physically separated from the main processor 1100 and included in the system 1000, or may be implemented in the same package as the main processor 1100. The storage devices 1300a and 1300b may be solid-state devices (SSDs) or memory cards, and be removably combined with other components of the system 100 through an interface, such as the connecting interface 1480 that is described further below. The storage devices 1300a and 1300b may be devices to which a standard protocol, such as, for example, a universal flash storage (UFS), an embedded multi-media card (eMMC), or a non-volatile memory express (NVMe), is applied. However, the storage devices 1300a and 1300b are not limited thereto.

The image capturing device 1410 may capture still images or moving images. The image capturing device 1410 may include, for example, a camera, a camcorder, and/or a webcam.

The user input device 1420 may receive various types of data input by a user of the system 1000 and may include, for example, a touch pad, a keypad, a keyboard, a mouse, and/or a microphone.

The sensor 1430 may detect various types of physical quantities, which may be obtained from the outside of the system 1000, and convert the detected physical quantities into electric signals. The sensor 1430 may include, for example, a temperature sensor, a pressure sensor, an illuminance sensor, a position sensor, an acceleration sensor, a biosensor, and/or a gyroscope sensor.

The communication device 1440 may transmit and receive signals between other devices outside the system 1000 according to various communication protocols. The communication device 1440 may include, for example, an antenna, a transceiver, and/or a modem.

The display 1450 and the speaker 1460 may serve as output devices configured to respectively output visual information and auditory information to the user of the system 1000.

The power supplying device 1470 may appropriately convert power supplied from a battery embedded in the system 1000 and/or an external power source, and supply the converted power to each of components of the system 1000.

The connecting interface 1480 may provide a connection between the system 1000 and an external device, which is connected to the system 1000, and is capable of transmitting and receiving data to and from the system 1000. The connecting interface 1480 may be implemented by using various interface schemes, such as, for example, advanced technology attachment (ATA), serial ATA (SATA), external SATA (e-SATA), small computer small interface (SCSI), serial attached SCSI (SAS), peripheral component interconnection (PCI), PCI express (PCIe), NVMe, IEEE 1394, a universal serial bus (USB) interface, a secure digital (SD) card interface, a multi-media card (MMC) interface, an eMMC interface, a UFS interface, an embedded UFS (eUFS) interface, and a compact flash (CF) card interface.

The storage device (e.g., 1300a or 1300b) may be a KVSSD. According to an embodiment of the disclosure, a system (e.g., 1000), to which a KVSSD is applied, is provided, and includes a main processor (e.g., 1100), a memory (e.g., 1200a and 1200b), and the KVSSD (e.g., 1300a and 1300b), in which the KVSSD is configured to perform the method for data storage as described above.

Figure 14:
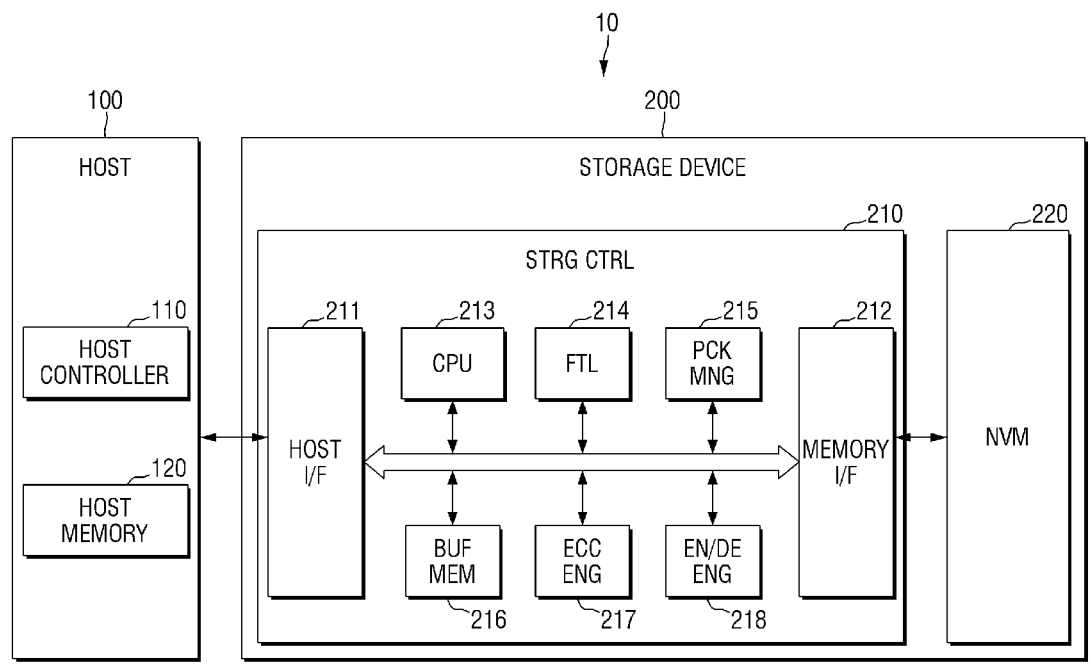
FIG. 14 is a block diagram of a host storage system according to an embodiment.

FIG. 14 is a block diagram of a host storage system 10 according to an embodiment.

The host storage system 10 may include a host 100 and a storage device 200. The storage device 200 may include a storage controller 210 and an NVM 220. According to an embodiment, the host 100 may include a host controller 110 and a host memory 120. The host memory 120 may serve as a buffer memory configured to temporarily store data to be transmitted to the storage device 200 or data received from the storage device 200.

The storage device 200 may include storage media configured to store data in response to requests from the host 100. As an example, the storage device 200 may include at least one of an SSD, an embedded memory, and a removable external memory. When the storage device 200 is an SSD, the storage device 200 may be a device that conforms to an NVMe standard. When the storage device 200 is an embedded memory or an external memory, the storage device 200 may be a device that conforms to a UFS standard or an eMMC standard. Each of the host 100 and the storage device 200 may generate a packet according to an adopted standard protocol and may transmit the packet.

When the NVM 220 of the storage device 200 includes a flash memory, the flash memory may include a 2D NAND memory array or a 3D (or vertical) NAND (VNAND) memory array. As another example, the storage device 200 may include various other kinds of NVMs. For example, the storage device 200 may include magnetic RAM (MRAM), spin-transfer torque MRAM, conductive bridging RAM (CBRAM), ferroelectric RAM (FRAM), PRAM, RRAM, and various other kinds of memories.

According to an embodiment, the host controller 110 and the host memory 120 may be implemented as separate semiconductor chips. Alternatively, in some embodiments, the host controller 110 and the host memory 120 may be integrated in the same semiconductor chip. As an example, the host controller 110 may be any one of a plurality of devices included in an application processor (AP). The AP may be implemented as, for example, a system-on-chip (SoC). Further, the host memory 120 may be an embedded memory included in the AP or an NVM or memory device located outside of the AP.

The host controller 110 may manage an operation of storing data (e.g., write data) of a buffer region of the host memory 120 in the NVM 220 or an operation of storing data (e.g., read data) of the NVM 220 in the buffer region.

The storage controller 210 may include a host interface 211, a memory interface 212, a CPU 213, a flash translation layer (FTL) 214, a packet manager 215, a buffer memory 216, an error correction code (ECC) engine 217, and an advanced encryption standard (AES) engine 218. The storage controller 210 may further include a working memory in which the FTL 214 is loaded. The CPU 213 may execute the FTL 214 to control data write and read operations on the NVM 220.

The host interface 211 may transmit and receive packets to and from the host 100. A packet transmitted from the host 100 to the host interface 211 may include a command or data to be written to the NVM 220. A packet transmitted from the host interface 211 to the host 100 may include a response to the command or data read from the NVM 220. The memory interface 212 may transmit data to be written to the NVM 220 to the NVM 220 or receive data read from the NVM 220. The memory interface 212 may be configured to comply with a standard protocol, such as, for example, Toggle or open NAND flash interface (ONFI).

The FTL 214 may perform various functions, such as, for example, an address mapping operation, a wear-leveling operation, and a garbage collection operation. The address mapping operation may be an operation of converting a logical address received from the host 100 into a physical address used to actually store data in the NVM 220. The wear-leveling operation may be a technique for preventing or reducing excessive deterioration of a specific block by allowing blocks of the NVM 220 to be uniformly used. As an example, the wear-leveling operation may be implemented using a firmware technique that balances erase counts of physical blocks. The garbage collection operation may be a technique for ensuring usable capacity in the NVM 220 by erasing an existing block after copying valid data of the existing block to a new block.

The packet manager 215 may generate a packet according to a protocol of an interface, which consents to the host 100, or parse various types of information from the packet received from the host 100. In addition, the buffer memory 216 may temporarily store data to be written to the NVM 220 or data to be read from the NVM 220. Although the buffer memory 216 may be a component included in the storage controller 210, the buffer memory 216 may be disposed outside of the storage controller 210 in embodiments.

The ECC engine 217 may perform error detection and correction operations on read data read from the NVM 220. For example, the ECC engine 217 may generate parity bits for write data to be written to the NVM 220, and the generated parity bits may be stored in the NVM 220 together with write data. During the reading of data from the NVM 220, the ECC engine 217 may correct an error in the read data by using the parity bits read from the NVM 220 along with the read data, and output error-corrected read data.

The AES engine 218 may perform at least one of an encryption operation and a decryption operation on data input to the storage controllers 210 by using a symmetric-key algorithm.

The storage device 200 may be a KVSSD. According to an embodiment of the disclosure, a host storage system (e.g., 10) is provided and includes a host (e.g., 100) and a KVSSD (e.g., 200), in which the KVSSD is configured to perform the method of data storage as described above.

Figure 15:
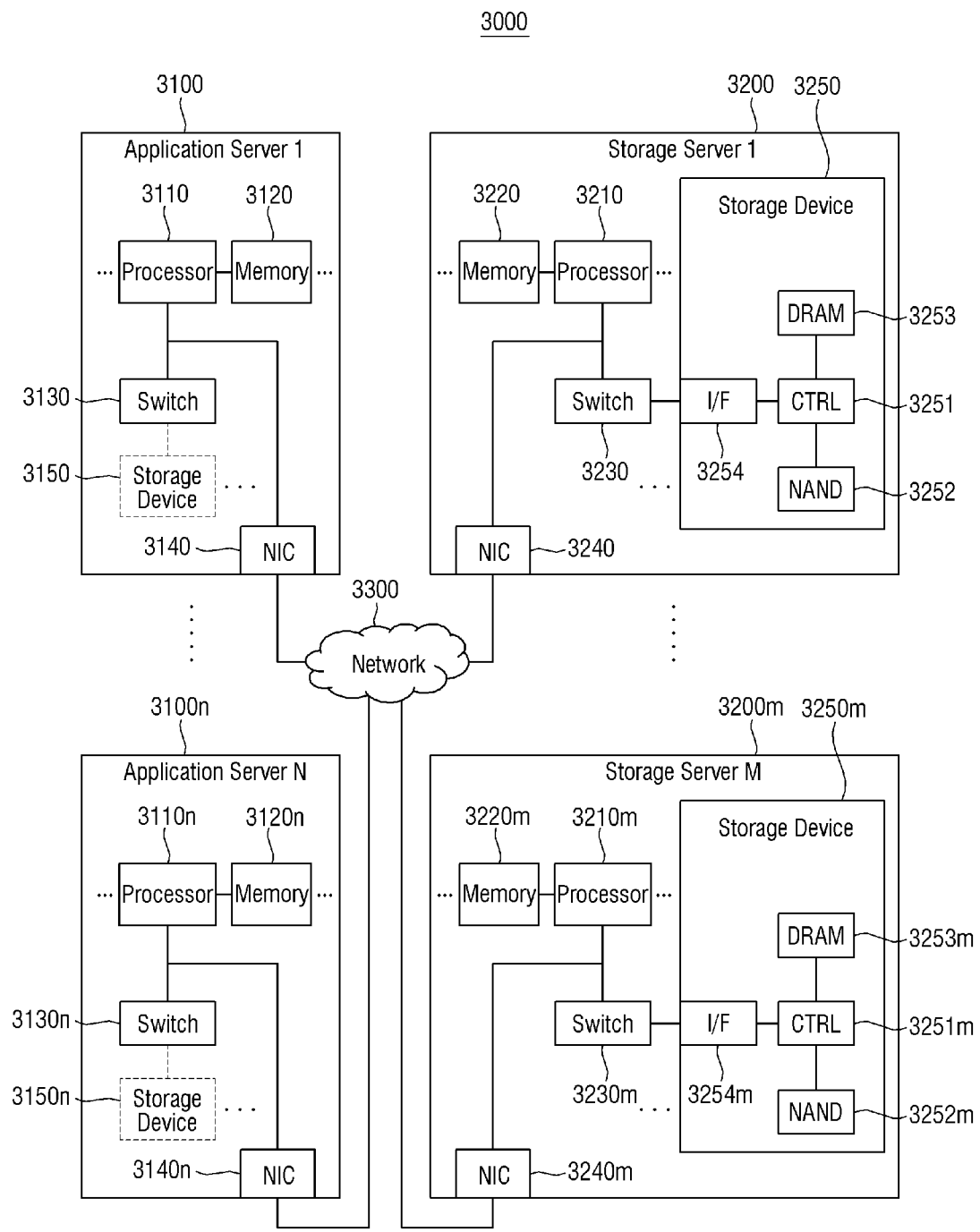
FIG. 15 is a diagram of a data center to which a memory device is applied according to an embodiment.

FIG. 15 is a diagram of a data center 3000 to which a memory device is applied, according to an embodiment.

Platform Portion—Server (Application/Storage)

Referring to FIG. 15, the data center 3000 may be a facility that collects various types of pieces of data and provides services, and may be referred to as a data storage center. The data center 3000 may be a system for operating a search engine and a database, and may be a computing system used by companies, such as banks or government agencies. The data center 3000 may include application servers 3100 to 3100n and storage servers 3200 to 3200m, in which n and m are positive integers. The number of application servers 3100 to 3100n and the number of storage servers 3200 to 3200m may be variously selected according to embodiments. The number of application servers 3100 to 3100n may be different from the number of storage servers 3200 to 3200m.

The application server 3100 or the storage server 3200 may include at least one of processors 3110 and 3210 and memories 3120 and 3220, at least one of switches 3130 to 3130n, at least one of network interface cards (NICs) 3140 to 3140n and 3240 to 3240m, at least one of DRAMs 3253 to 3253m, and at least one of controllers 3251 to 3251m. The storage server 3200 will now be described as an example. The processor 3210 may control all operations of the storage server 3200, access the memory 3220, and execute instructions and/or data loaded in the memory 3220. The memory 3220 may be, for example, a double-data-rate synchronous DRAM (DDR SDRAM), a high-bandwidth memory (HBM), a hybrid memory cube (HMC), a dual in-line memory module (DIMM), Optane DIMM, and/or a non-volatile DIMM (NVMDIMM). In some embodiments, the numbers of processors 3210 and memories 3220 included in the storage server 3200 may be variously selected. In an embodiment, the processor 3210 and the memory 3220 may provide a processor-memory pair. In an embodiment, the number of processors 3210 may be different from the number of memories 3220. The processor 3210 may include a single-core processor or a multi-core processor. The above description of the storage server 3200 may be similarly applied to the application server 3100. In some embodiments, the application server 3100 may not include a storage device 3150. The storage server 3200 may include at least one storage device 3250. The number of storage devices 3250 included in the storage server 3200 may be variously selected according to embodiments.

Platform Portion—Network

The application servers 3100 to 3100n may communicate with the storage servers 3200 to 3200m through a network 3300. The network 3300 may be implemented by using a fiber channel (FC) or Ethernet. In this case, the FC may be a medium used for relatively high-speed data transmission and may use an optical switch with high performance and high availability. The storage servers 3200 to 3200m may be provided as file storages, block storages, or object storages according to an access method of the network 3300.

In an embodiment, the network 3300 may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. In an embodiment, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

Hereinafter, the application server 3100 and the storage server 3200 will mainly be described. A description of the application server 3100 may be applied to another application server 3100n, and a description of the storage server 3200 may be applied to another storage server 3200m.

The application server 3100 may store data, which is requested by a user or a client to be stored, in one of the storage servers 3200 to 3200m through the network 3300. Also, the application server 3100 may obtain data, which is requested by the user or the client to be read, from one of the storage servers 3200 to 3200m through the network 3300. For example, the application server 3100 may be implemented as a web server or a database management system (DBMS).

The application server 3100 may access a memory 3120n or a storage device 3150n, which is included in another application server 3100n, through the network 3300. Alternatively, the application server 3100 may access memories 3220 to 3220m or storage devices 3250 to 3250m, which are included in the storage servers 3200 to 3200m, through the network 3300. Thus, the application server 3100 may perform various operations on data stored in application servers 3100 to 3100n and/or the storage servers 3200 to 3200m. For example, the application server 3100 may execute an instruction for moving or copying data between the application servers 3100 to 3100n and/or the storage servers 3200 to 3200m. In this case, the data may be moved from the storage devices 3250 to 3250m of the storage servers 3200 to 3200m to the memories 3120 to 3120n of the application servers 3100 to 3100n directly or through the memories 3220 to 3220m of the storage servers 3200 to 3200m. The data moved through the network 3300 may be data encrypted for security or privacy.

Organic Relationship—Interface Structure/Type

The storage server 3200 will now be described as an example. An interface 3254 may provide physical connection between a processor 3210 and a controller 3251 and a physical connection between a network interface card (NIC) 3240 and the controller 3251. For example, the interface 3254 may be implemented using a direct attached storage (DAS) scheme in which the storage device 3250 is directly connected with a dedicated cable. For example, the interface 3254 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The storage server 3200 may further include a switch 3230 and the NIC 3240. The switch 3230 may selectively connect the processor 3210 to the storage device 3250 or selectively connect the NIC 3240 to the storage device 3250 under the control of the processor 3210.

In an embodiment, the NIC 3240 may include a network interface card and a network adaptor. The NIC 3240 may be connected to the network 3300 by, for example, a wired interface, a wireless interface, a BLUETOOTH interface, or an optical interface. The NIC 3240 may include an internal memory, a digital signal processor (DSP), and a host bus interface and may be connected to the processor 3210 and/or the switch 3230 through the host bus interface. The host bus interface may be implemented as one of the above-described examples of the interface 3254. In an embodiment, the NIC 3240 may be integrated with at least one of the processor 3210, the switch 3230, and the storage device 3250.

Organic Relationship—Interface Operation

In the storage servers 3200 to 3200m or the application servers 3100 to 3100n, a processor may transmit a command to storage devices 3150 to 3150n and 3250 to 3250m or the memories 3120 to 3120n and 3220 to 3220m and program or read data. In this case, the data may be data of which an error is corrected by an ECC engine. The data may be data on which a data bus inversion (DBI) operation or a data masking (DM) operation is performed, and may include cyclic redundancy code (CRC) information. The data may be data encrypted for security or privacy.

Storage devices 3150 to 3150n and 3250 to 3250m may transmit a control signal and a command/address signal to NAND flash memory devices 3252 to 3252m in response to a read command received from the processor. Thus, when data is read from the NAND flash memory devices 3252 to 3252m, a read enable (RE) signal may be input as a data output control signal, and thus, the data may be output to a DQ bus. A data strobe signal DQS may be generated using the RE signal. The command and the address signal may be latched in a page buffer depending on a rising edge or falling edge of a write enable (WE) signal.

Product Portion—SSD Basic Operation

The controller 3251 may control all operations of the storage device 3250. In an embodiment, the controller 3251 may include SRAM. The controller 3251 may write data to the NAND flash memory device 3252 in response to a write command or read data from the NAND flash memory device 3252 in response to a read command. For example, the write command and/or the read command may be provided from the processor 3210 of the storage server 3200, the processor 3210m of another storage server 3200m, or the processors 3110 and 3110n of the application servers 3100 and 3100n. DRAM 3253 may temporarily store (or buffer) data to be written to the NAND flash memory device 3252 or data read from the NAND flash memory device 3252. Also, the DRAM 3253 may store metadata. Here, the metadata may be user data or data generated by the controller 3251 to manage the NAND flash memory device 3252. The storage device 3250 may include a secure element (SE) for security or privacy.

The storage device 200 may be a KVSSD. According to an embodiment of the disclosure, a data center system (e.g., 3000) is provided and includes a plurality of application servers (e.g., 3100 to 3100n), and a plurality of storage servers (e.g., 3200 to 3200m), in which each storage server includes a KVSSD, in which the KVSSD is configured to perform the method of data storage as described above.

As is traditional in the field of the disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

According to an embodiment of the disclosure, a computer readable storage medium having a computer program stored thereon is provided, in which the method of data storage as described above is implemented when the computer program is executed by a processor.

According to an embodiment of the disclosure, an electronic apparatus is provided and includes a processor and a memory storing a computer program, in which the computer program, when executed by the processor, implements the method of data storage as described above.

According to embodiments of the disclosure, a computer-readable storage medium may also be provided, in which a computer program is stored thereon. The program, when executed, may implement a method of LSM-Tree based KV data storage according to embodiments of the present disclosure. Examples of computer-readable storage media include read-only memory (ROM), random access programmable read-only memory (PROM), electrically erasable programmable read-only memory (EEPROM), random access memory (RAM), dynamic random access memory (DRAM), static random access memory (SRAM), flash memory, non-volatile memory, CD-ROM, CD-R, CD+R, CD-RW, CD+RW, DVD-ROM, DVD-R, DVD+R, DVD-RW, DVD+RW, DVD-RAM, BD-ROM, BD-R, BD-R LTH, BD-RE, BLU-RAY or optical disk memory, hard disk drive (HDD), solid state drive (SSD), card-based memory (such as, e.g., multimedia cards, Secure Digital (SD) cards and/or Extreme Digital (XD) cards), magnetic tapes, floppy disks, magneto-optical data storage devices, optical data storage devices, hard disks, solid state disks, and/or any other device, where the other device is configured to store the computer programs and any associated data, data files, and/or data structures in a non-transitory manner and to provide the computer programs and any associated data, data files, and/or data structures to a processor or computer, so that the processor or computer may execute the computer program. The computer program in the computer readable storage medium may run in an environment deployed in a computer device such as, for example, a terminal, client, host, agent, server, etc. In one example, the computer program and any associated data, data files and/or data structures are distributed on a networked computer system such that the computer program and any associated data, data files and/or data structures are stored, accessed, and/or executed in a distributed manner by one or more processors or computers.

According to a method of log-structured merge-tree based KV data storage according to an embodiment of the disclosure, the metadata is stored in the SCM, which may prevent index information loss due to, for example, an abnormal power failure. Also, in an absence of hot data, since the index information is stored in both the DRAM and the SCM, only one access to NAND is utilized when reading data. The SCM acts as a read cache to store a copy of hot data. As a result, a read amplification issue can be minimized or reduced, and the read performance can be increased. Further, the data in the cache will not be lost after an abnormal power failure and restart, preventing or reducing the fluctuation of read performance.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A log-structured merge-tree (LSM-Tree) based key-value (KV) data storage method, the method comprising:
writing KV data into a NAND flash memory, wherein the KV data comprises a key-value pair including a key and a corresponding value, the KV data is stored in a key-value solid state drive (KVSSD), and the KVSSD comprises a storage class memory (SCM) and the NAND flash memory; and storing metadata of the KV data in the SCM, wherein the metadata of the KV data comprises the key and index information of the corresponding value of the KV data, and the index information of the corresponding value of the KV data indicates address information of the KV data in the NAND flash memory.

2. The method of data storage according to claim 1, further comprising:

creating index information of the metadata in a level list stored in a dynamic random access memory (DRAM) included in the KVSSD based on the metadata, wherein the index information of the metadata indicates address information of the metadata in the SCM.

3. The method of data storage according to claim 2, further comprising:

reconstructing the level list comprising the index information of the metadata in the DRAM based on the metadata stored in the SCM, after an abnormal power failure and restart of a storage device.

4. The method of data storage according to claim 1, wherein a portion of the SCM is configured as a cache, and the method further comprises storing KV data satisfying a cache condition in the cache.

5. A system to which a key-value solid state drive (KVSSD) is applied, comprising:

a main processor;
a memory; and
the KVSSD, wherein the KVSSD is configured to perform the method of data storage according to claim 1.

6. A key-value (KV) solid state drive (KVSSD), comprising:

a storage class memory (SCM); and
a NAND flash memory, wherein the KVSSD is configured to store KV data based on a log-structured merge-tree (LSM-Tree), and the KV data comprises a key-value pair including a key and a corresponding value, wherein the SCM is configured to store metadata of the KV data, wherein the metadata of the KV data comprises the key and index information of the corresponding value of the KV data, and the index information of the corresponding value of the KV data indicates address information of the KV data in the NAND flash memory, wherein the NAND flash memory is configured to store the KV data.

7. The KVSSD according to claim 6, wherein the KVSSD further comprises a dynamic random access memory (DRAM), and the DRAM is configured to store a level list comprising index information of the metadata, the index information of the metadata indicating address information of the metadata in the SCM.

8. The KVSSD according to claim 7, wherein the index information of the metadata in the level list is reconstructed in the DRAM based on the metadata stored in the SCM, after an abnormal power failure and restart of a storage device.

9. The KVSSD according to claim 6, wherein a portion of a storage area of the SCM is configured as a cache, and storing KV data satisfying a cache condition in the cache.

* * * * *